(12) United States Patent
Chancel

(10) Patent No.: US 12,115,561 B2
(45) Date of Patent: Oct. 15, 2024

(54) DRILL BIT AND REAMER CLEANING DEVICE

(71) Applicant: Sylvain Christian Chancel, Golden, CO (US)

(72) Inventor: Sylvain Christian Chancel, Golden, CO (US)

( * ) Notice: Subject to any disclaimer, the term of this patent is extended or adjusted under 35 U.S.C. 154(b) by 0 days.

(21) Appl. No.: 18/079,194

(22) Filed: Dec. 12, 2022

(65) Prior Publication Data
US 2023/0107682 A1    Apr. 6, 2023

Related U.S. Application Data

(60) Provisional application No. 63/288,989, filed on Dec. 13, 2021.

(51) Int. Cl.
| | |
|---|---|
| B08B 1/32 | (2024.01) |
| A46B 13/00 | (2006.01) |
| B08B 1/12 | (2024.01) |
| B08B 3/04 | (2006.01) |
| B08B 3/14 | (2006.01) |
| B23B 45/00 | (2006.01) |

(52) U.S. Cl.
CPC ............. *B08B 1/32* (2024.01); *A46B 13/001* (2013.01); *B08B 1/12* (2024.01); *B08B 3/04* (2013.01); *B08B 3/14* (2013.01); *A46B 2200/3073* (2013.01); *B23B 45/003* (2013.01)

(58) Field of Classification Search
CPC .. B08B 1/04; B08B 1/002; B08B 3/04; B08B 3/14; B08B 9/36; A46B 13/001; A46B 13/02; A47L 21/00; A47L 21/02
See application file for complete search history.

(56) References Cited

U.S. PATENT DOCUMENTS

| | | | | |
|---|---|---|---|---|
| 4,750,230 | A * | 6/1988 | Osborn | A63B 60/36 15/97.1 |
| 5,269,615 | A * | 12/1993 | Lewis, Jr. | A46B 9/02 401/11 |
| 5,384,933 | A * | 1/1995 | Wang | A47L 23/22 15/40 |
| 5,404,610 | A * | 4/1995 | Coyer, Sr. | A63B 57/60 15/160 |
| 10,799,970 | B2 * | 10/2020 | Jenkins | B23G 9/009 |

* cited by examiner

*Primary Examiner* — Shay Karls
(74) *Attorney, Agent, or Firm* — Skaar Ulbrich Macari, PA

(57) ABSTRACT

A rotary cutting tool cleaning system, device, and method for cleaning debris and shavings from a rotary cutting tool such as a drill bit or reamer. The system includes at least one roller rotatably mounted in a cartridge, wherein the cartridge includes a rotary cutting tool opening in a top thereof for insertion of the rotary cutting tool into the cartridge. The rollers that remove the debris may be brushed rollers configured for axial rotational engagement with the rotary cutting tool. The system can be non-electric or, alternatively include a power supply that rotate the at least one roller.

19 Claims, 7 Drawing Sheets

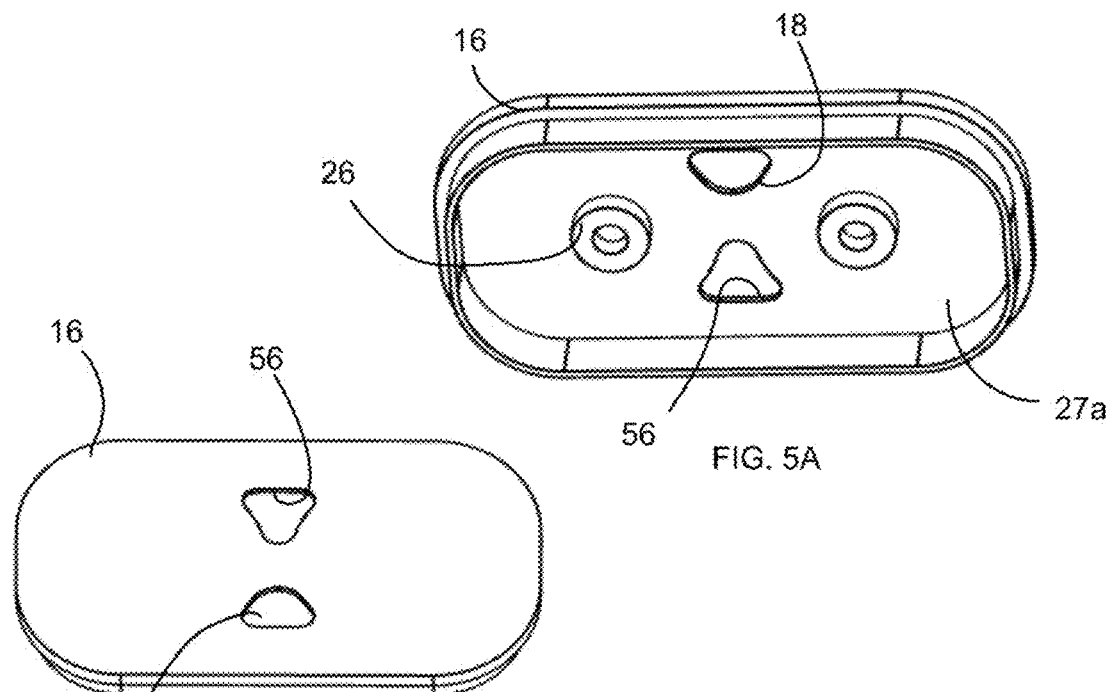
FIG. 5A
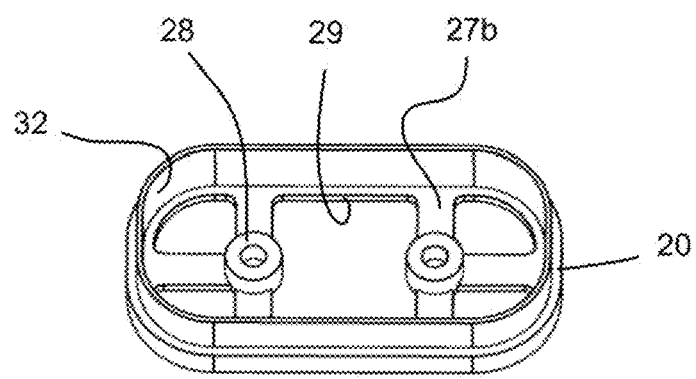
FIG. 5B
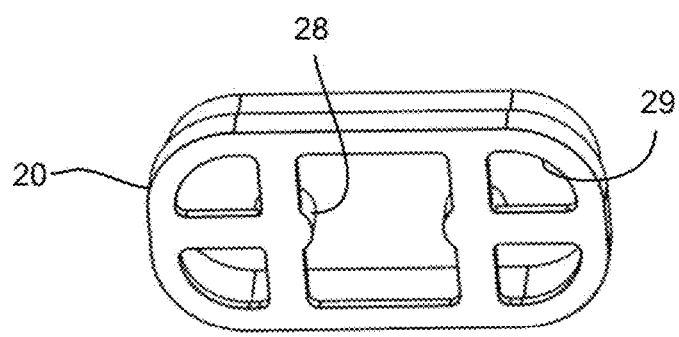
FIG. 5C
FIG. 5D

DRILL BIT AND REAMER CLEANING DEVICE

PRIORITY

This application claims priority to U.S. Provisional Application No. 63/288,989, which was filed on Dec. 13, 2021, the entire disclosures of which is hereby incorporated by reference.

FIELD OF THE INVENTION

The present invention relates to a cleaning system for rotary cutting tools; and more particularly, a rotary cutting tool cleaning system capable of being operated with or without an integrated power supply.

BACKGROUND

Rotary cutting tools are used in a wide variety of industries to remove a portion of a material. Depending upon the industry, the material may be wood, metal, cement, earth, plastics, bone, or any other synthetic or natural material. Rotary cutting tools generally come in a number of shapes, sizes, and configurations, depending upon the material being cut. For example, rotary cutting tools that can be used in the present invention include, but are not limited to, drill bits, reamers, augers, router bits, and the like.

Rotary cutting tools generally comprise a long cylindrical body having a shank and/or tang that is insertable into a rotary tool such as a drill or drill press. The body of the rotary cutting tool typically comprises a pointed end having alternating flutes and lands extending helically towards the shank. The flutes and lands define cutting surfaces of the rotary cutting tool.

When cutting, drilling, and/or milling operations are done with a rotary cutting tool, it is common for debris and shavings to become stuck in the flutes of the rotary cutting tool. Stuck debris and shavings can shorten the life of the rotary cutting tool, create unwanted heat, and alter the tools cutting accuracy.

Unfortunately, existing devices and methods for cleaning rotary cutting tools are hazardous and time consuming. More specifically, conventional cleaning methods often require a user to touch the sharp cutting surfaces with their hands, which increases the user's risk of injury. Alternatively, they require a user to use a device that digs into or travels along the flutes of the tool to remove the debris. This method of cleaning often leads to the user damaging the cutting surfaces of the rotary tool. All current cleaning systems and methods typically require multiple steps, cleaning rags, and collection of debris and shavings from a work surface or floor.

Therefore, what is needed is a rotary cutting tool (e.g., drill bit or reamer) cleaning system and method for safely cleaning debris and shavings from the cutting tool in an efficient, safe and clean manner.

What is also needed is a rotary cutting tool cleaning system, device and method, that is able to use the power of a rotary tool, handheld drill, or drill press to operate the cleaning system. The rotary cutting tool cleaning system of the present invention can be operated with or without an integrated power supply.

Another need is a rotary cutting tool cleaning system, device, and method that is portable or easily transportable to job sites or locations.

Still another need is a rotary cutting tool cleaning system, device, and method that is easily disassembled for cleaning.

SUMMARY

The present invention is directed to a rotary cutting tool cleaning system, device, and method, for effectively, efficiently, and safely cleaning debris and shavings from a rotary cutting tool such as a drill bit and/or reamer. The rotary cutting tool cleaning system of the present invention can be operated with or without an internal battery or power supply.

According to one example embodiment of the present invention, the rotary cutting tool cleaning system comprises a cleaning cartridge or housing having at least one opening configured to receive a rotary cutting tool needing to be cleaned. The interior of the cleaning cartridge or housing contains one or more cleaning members that are designed to engage and remove the debris from the rotary cutting tool. In one example embodiment, the one or more cleaning members comprise rollers having bristles extending or radiating outwardly from an outer surface of the rollers. The bristles are designed to extend into and clear debris from the flutes of the rotary cutting tool.

In another example embodiment of the present invention, the cleaning members or rollers are position or oriented proximate to each other such that the bristles extend into or overlap each other. The rotary cutting tool is positionable proximate to or in between the rollers, whereby the bristles of each of the rollers are able to extend into and clear the debris from multiple sides of the rotary cutting tool. While two rollers have been discussed, having more than two bristled rollers are within the spirit and scope of the invention.

The cartridge or housing of the present invention comprise a number of configurations. In one example embodiment, the cartridge or housing comprises a cleaning member or roller containment portion that is configured to house the cleaning members or rollers. The cartridge or housing is configured to permit rotatable movement of the cleaning members or rollers within the containment portion of the housing.

In another example embodiment the cartridge or housing includes a debris receiving or capture portion that is designed or configured to receive and collect debris removed from the rotary cutting tool. The debris collection portion may be removable from the cartridge or housing for emptying and cleaning. In another example embodiment, the debris collection portion may comprise a door or hatch that may be operated by a user to open the debris collection portion and empty its contents.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and are being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE FIGURES

FIG. 5A is a bottom perspective view of a lid of the cartridge of the present invention;

FIG. 5B is a top perspective view of the lid of the cartridge of the present invention;

FIG. 5C is a bottom perspective view of a bottom or support frame of the cartridge of the present invention;

FIG. 5D is a top perspective view of a top surface of the support frame of the cartridge;

Having thus described the invention in general terms, reference is now made to the accompanying figures, which show different views of different example embodiments.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The system, device, and method of the present invention may be used to clean a rotary cutting tool such as a drill bit and/or reamer and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the system, device, and method of the present invention may be related in the following exemplary fashion. It is not intended to limit the scope or nature of the relationships between the various elements and the following examples are presented as illustrative examples only.

By way of example, and referring to FIGS. 1-8, some embodiments of the invention include a rotary cutting tool cleaning system, device, and method 10 for cleaning debris and shavings from a rotary cutting tool 30, such as a drill bit, reamer, and the like. The cleaning system, device, and method 10 of the present invention generally comprises at least one cleaning member 12 rotatably mounted within a cartridge or housing 14. The cleaning member 12 is designed to engage and remove debris from the rotary cutting tool.

Figure 1:
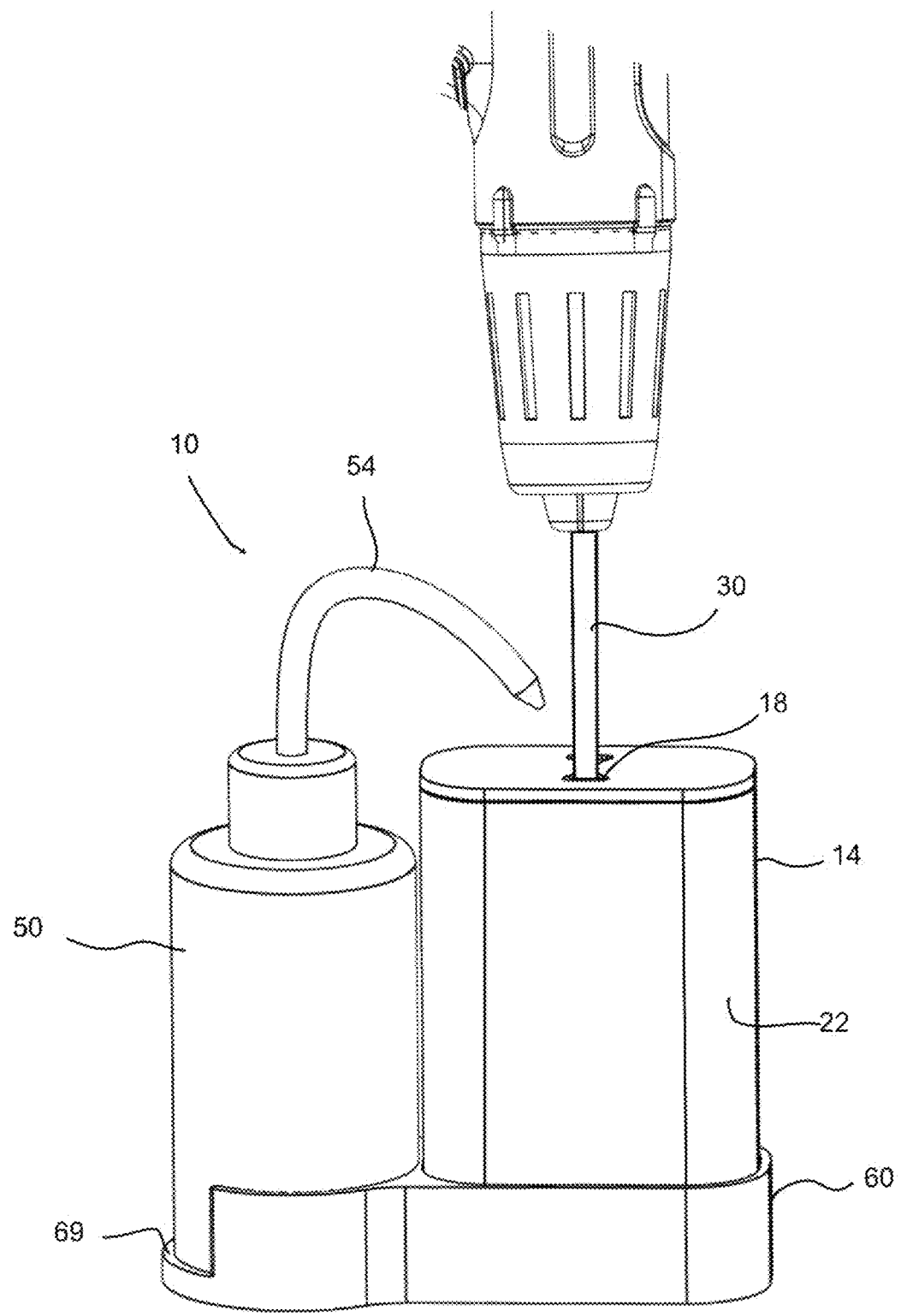
FIG. 1 is a perspective view of the rotary cutting tool cleaning system, device, and method.

More specifically, as illustrated in FIG. 1, the cartridge 14 of the cleaning system 10 comprises a top or cap 16 having at least one opening or hole 18 extending through it and configured to receive a portion of the rotary cutting tool 30. The cartridge 14 may also include a bottom or floor 20 opposite the top or cap 16. A side wall 22 extends between the top or cap 16 and the bottom or floor 20, all of which defines the interior 24 of the cartridge 14. The cartridge 14 may comprise any durable material such as plastic, metal and the like. A generally rigid plastic material may be used to provide a light and portable system.

Figure 4:
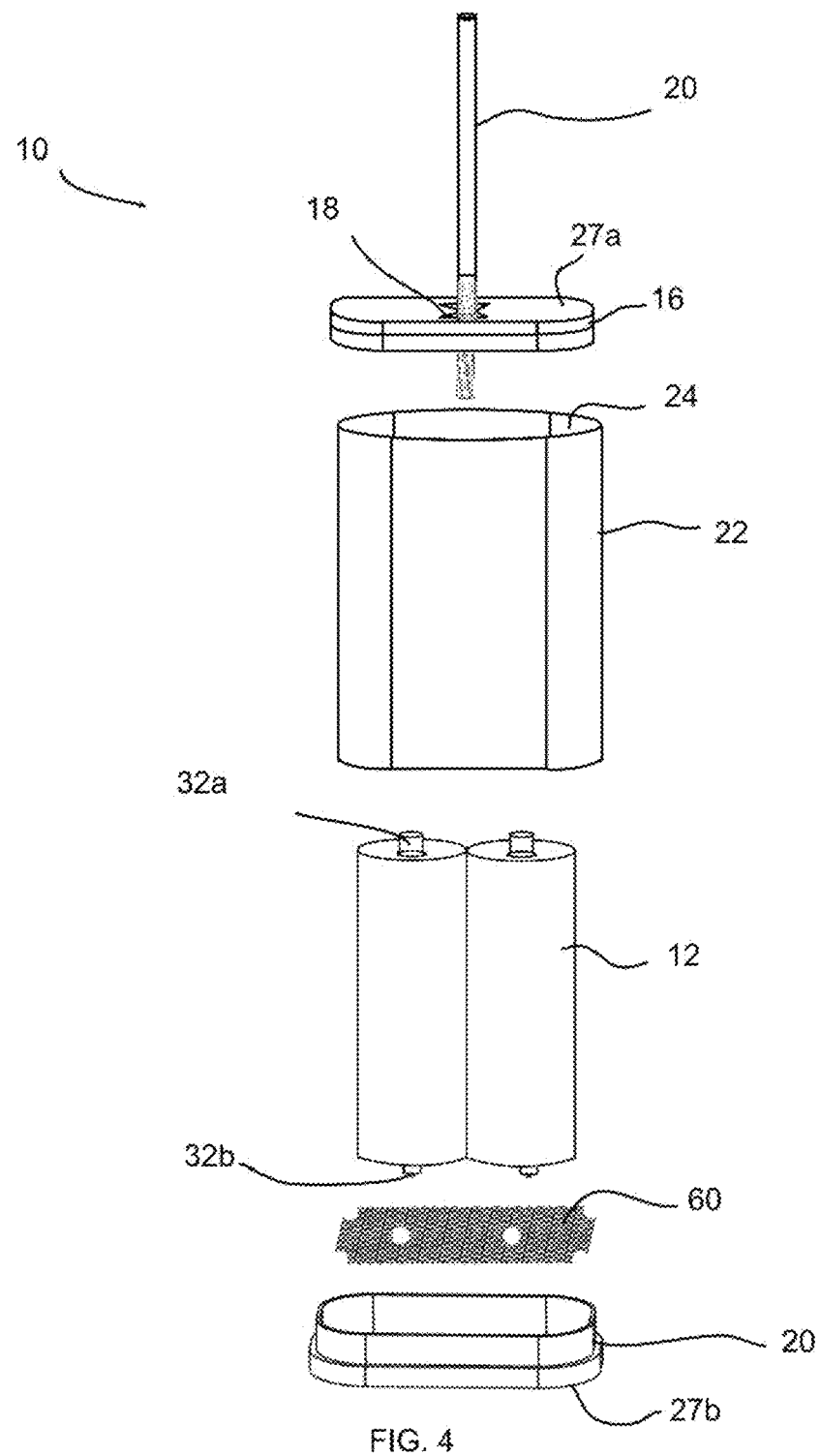
FIG. 4 is an exploded view of the cleaning cartridge of the present invention.
Figure 6:
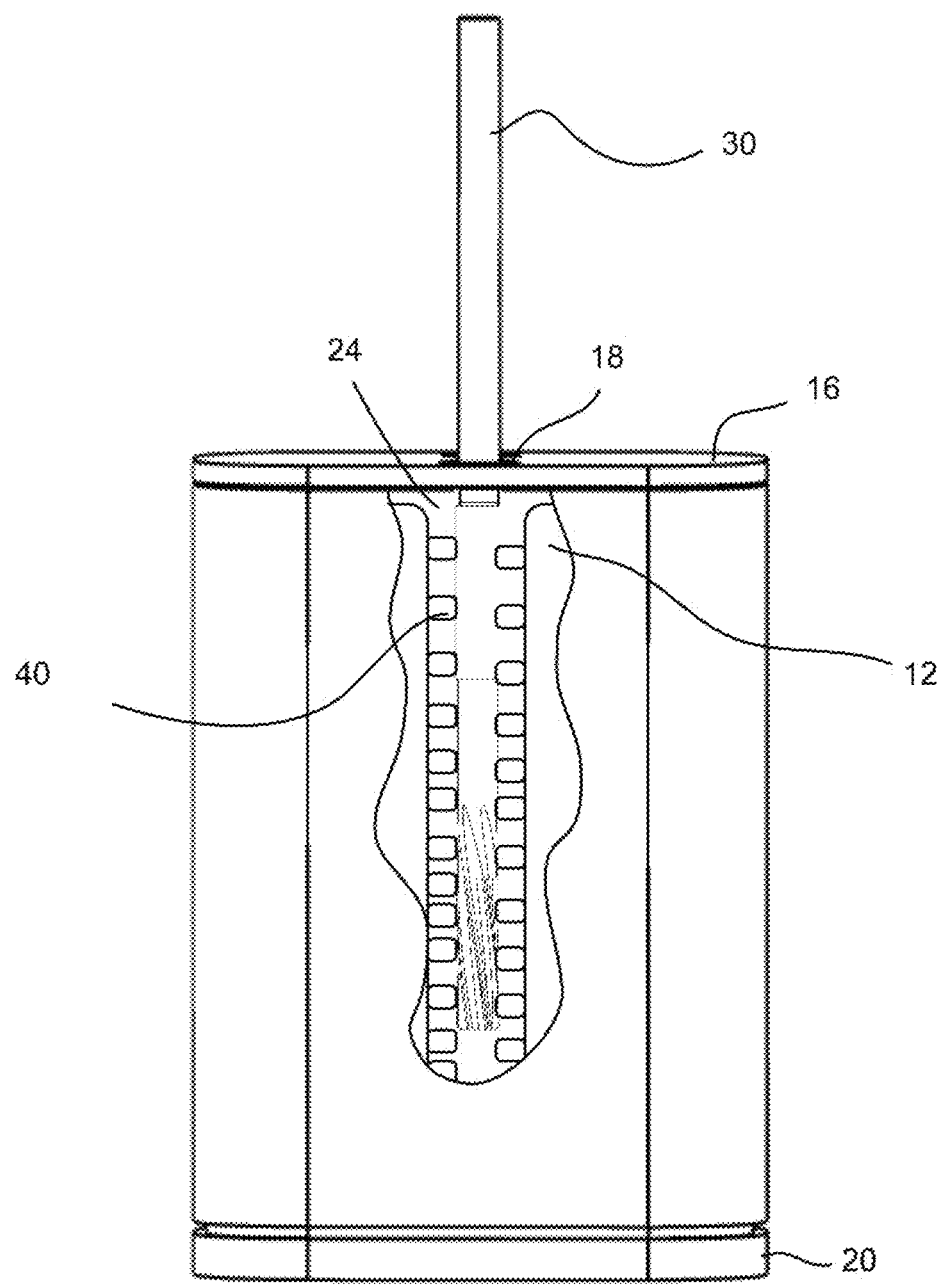
FIG. 6 is a front view of the cartridge of the present inventions having a cut-away to show the rotary cutting tool positioned in the interior of the cartridge.
Figures 7A, 7B:
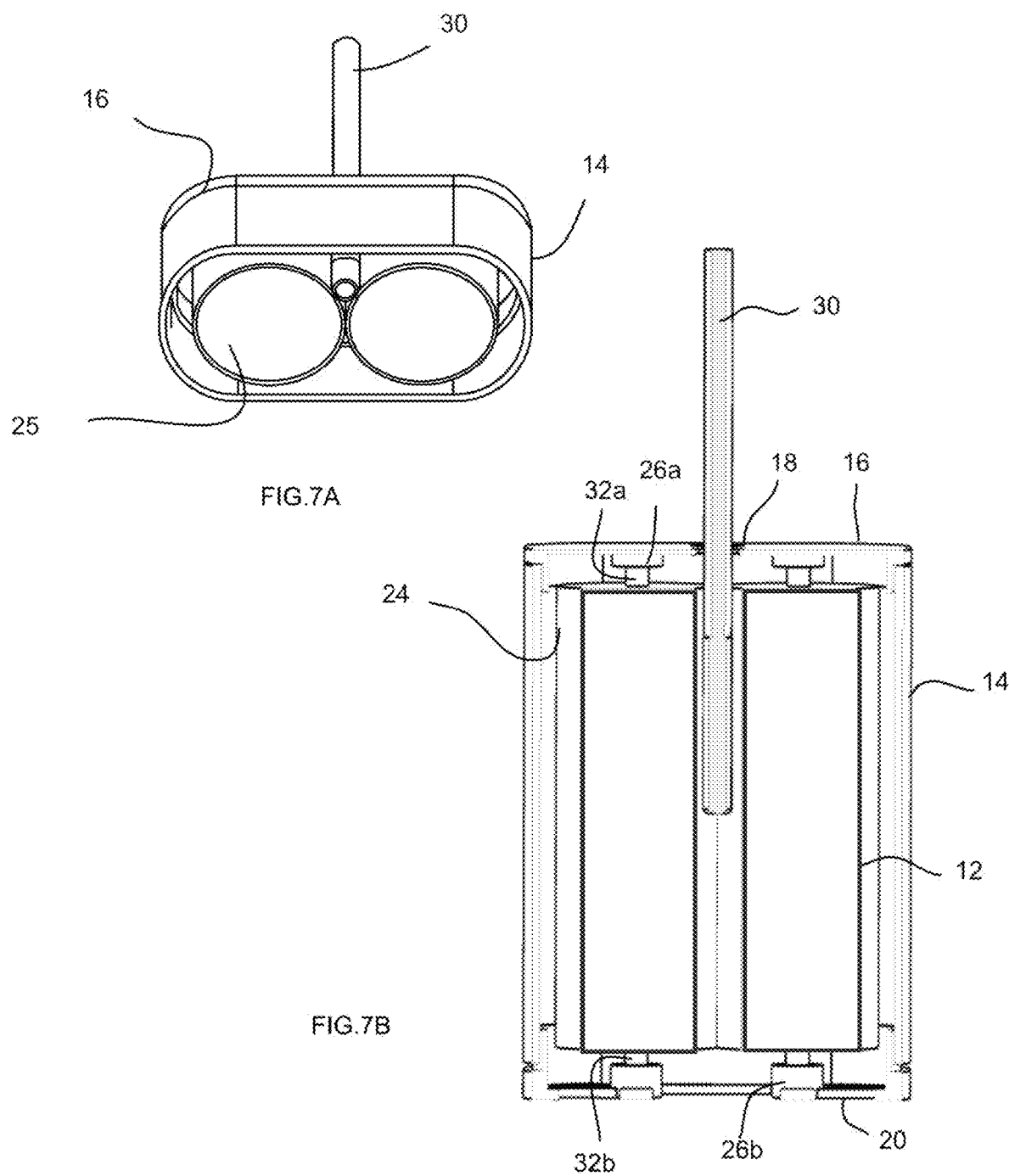
FIG. 7A is a cross section view of the cartridge showing the position of the cleaning members and rotary cutting tool.
FIG. 7B is a cross section view of the cartridge showing the position of the cleaning members within the interior of the cartridge.

Turning now to FIGS. 4-6, the cartridge 14 is configured to hold or contain one or more cleaning members 12 within its interior 24. The cleaning members 12 may comprise rollers that can be rotatably mounted within the interior 24 of the cartridge 14 to aid in removing and containing the debris from the rotary cutting tool 30. While the cleaning members 12 are illustrated in a vertical orientation within the cartridge 14, it is also contemplated herein that the cleaning members 12 can be oriented in any direction within the cartridge 14.

As particularly illustrated in FIGS. 5A-5D, the top or cap 16 may include a seat or socket 26a on its lower surface 27a and the bottom or floor 20 includes a seat or socket 26b on its upper surface 27b. The seat or sockets 26a and 26b are aligned or in registration with each other and configured to receive posts 32a and 32b the seat or socket 26a. The arrangement of the sockets 26a, 26b, and posts 32a, 32b, permit axial rotation of the cleaning members 12. It is also contemplated herein the posts may extend from the top 16 and bottom 20 that are insertable into sockets formed in the ends of the cleaning members 12. While not illustrated, bearings and other rotational friction reduction aids may be employed between the cleaning members 12 and the cartridge 14.

In one example embodiment of the present invention, the bottom or floor 20 of the cartridge includes one or more openings 29 extending through it. The openings 29 are configured to permit the debris removed from the rotary cutting tool 30 to fall out of the cartridge 14 as it is removed. In another example embodiment of the present invention, there are no openings in the bottom or floor 20 of the cartridge 14. Instead, the bottom or floor 20 is removable or detachable from the cartridge 14 for emptying of the collected debris. The bottom or floor 20 may comprise a side wall 32 that is insertable into the interior 24 of the cartridge 14 while the debris is being collected during the cleaning process. The side wall 32 of the bottom or floor 20 acts to contain the collected debris in the bottom or floor 20 until such time that it is removed from the cartridge 14 for emptying. In another example embodiment, the cartridge 14 may comprise a lower drawer that collects the debris and that can either be opened or removed for emptying the debris.

Figure 8:
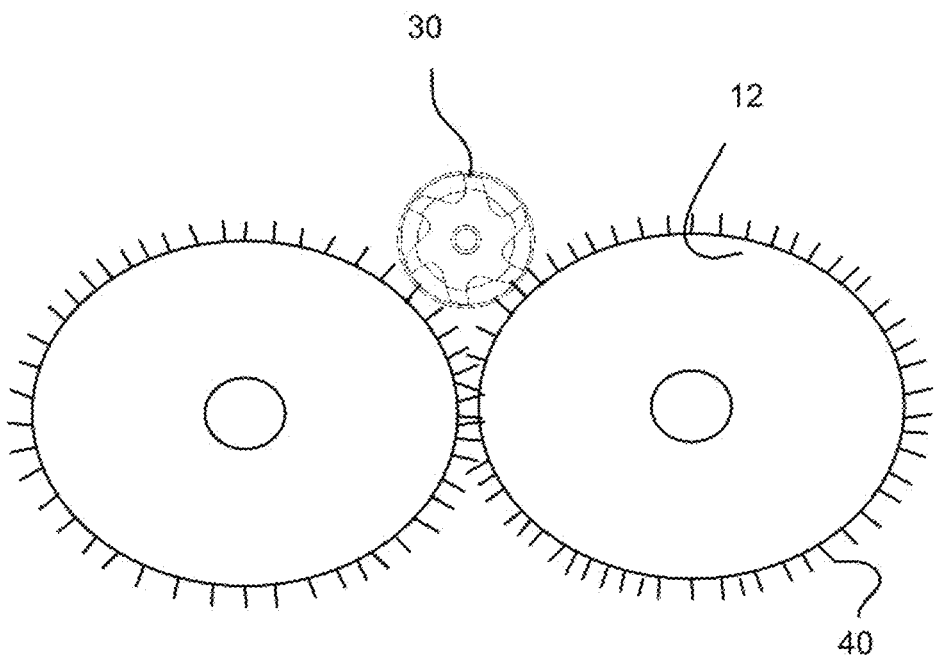
FIG. 8 is an end view of the cleaning members and rotary cutting members.

As illustrated in FIGS. 6 and 8, the cleaning members or the roller 12 have a plurality of outwardly extending engagement members 40 that are designed to engage and remove the debris from the rotary cutting tool 30. In one example embodiment, the engagement members 40 comprise one or more bristles or bunches of bristles 40. The engagement members 40 are preferably rigid enough to be able to remove the debris from the rotary cutting tool 30 but flexible enough to be able to bend around the surface of the rotary cutting tool 30. The engagement members 40 may comprise any materials including but not limited to brass, copper, or any other metal material. The engagement members 40 may also comprise a generally rigid plastic or synthetic material.

As particularly illustrated in FIGS. 6 and 8, the arrangement or orientation of the cleaning members 12, engagement members 40 and the rotary cutting tool 30 aid in effectively cleaning or removing debris stuck in the flutes of the rotary cutting tool 30. In one example embodiment, the cleaning members 12 are positioned generally adjacent to each other such that the engagement members or bristles 40 touch, overlap, or engagement each other. The rotary cutting tool is positioned adjacent to or between the cleaning members 12 such that the engagement members or bristles 40 engage or contact the surface of the rotary cutting tool 30. Different arrangements or configurations are possible depending upon the rotary cutting tool and the debris stuck in the flutes. For example, a stronger or more rigid engagement member or bristle 40 may be required for stuck metal debris but a softer or more pliable engagement member or bristle 40 may be used for wood debris.

Figure 2:
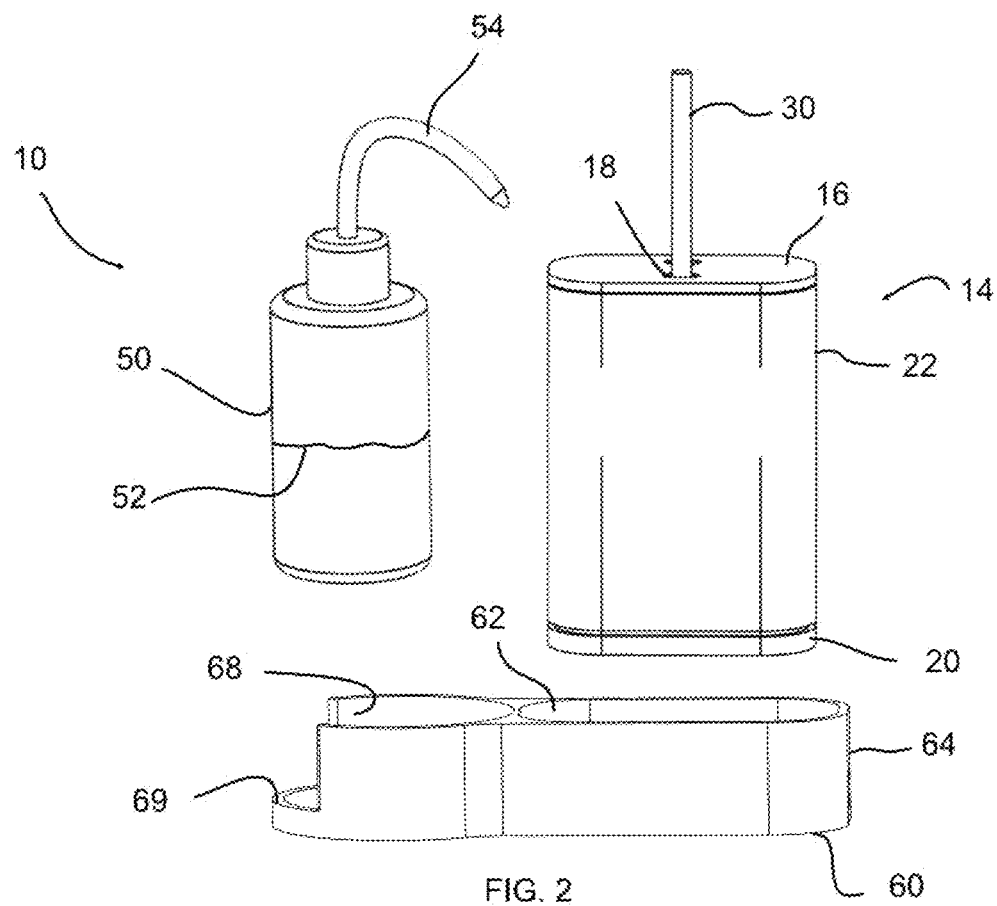
FIG. 2 is a perspective view of the rotary cutting tool cleaning system, device, and method having its components separate from a tray of the present invention.

As illustrated in FIGS. 1 and 2, the system 10 of the present invention may also include a vessel or container 50 to hold and dispense a liquid 52 such as water, oil, or a penetrant into the interior 24 of the cartridge 12. The container 50 includes a spout 54 that is insertable into an opening 56 extending through the top 16 of the cartridge 14. The liquid 52 flows out of the container 50 through the spout 54 and onto the rotary cutting tool 30. The liquid 52 aids in removing the debris and carrying to the bottom 20 of the cartridge 14. In one example embodiment, as illustrated in FIG. 4, the bottom 20 contains a screen or filter 60 to capture the debris while allowing the liquid to flow passed it. The screen enables the debris and liquid to be separated for easier cleaning. The screen may be removable from the bottom 20 for cleaning and replacement.

Figure 3:
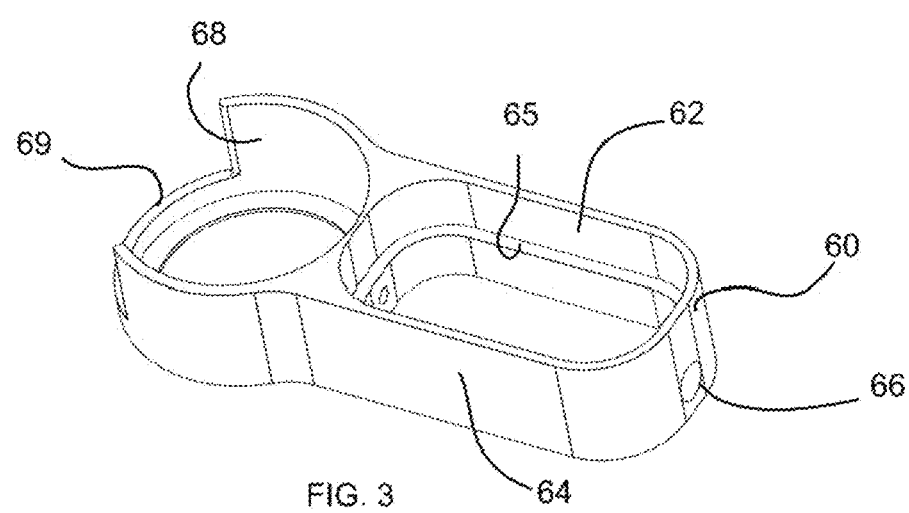
FIG. 3 is a perspective view of the tray of the present invention.

As illustrated in FIGS. 1-3, the system 10 may include a carrier 60 having at least a first recess 62 extending into it for receiving the cartridge 14. The first recess 62 may include a peripheral wall 64 that at least partially encircles the cartridge 14 to aid in preventing it from spilling over. The first recess 64 of the carrier 60 also has a shape designed to hold the cartridge 14 without any or with minimal rotational movement. As will be explained below, preventing rotational movement of the cartridge 14 is important when cleaning a rotary cutting tool 30.

In another example embodiment of the present invention, at least the first recess 62 comprises at least one inner shoulder 65 extending at least partially about its inner surface. The shoulder 65 is configured to hold the cartridge 14 above a work surface. The carrier 60 also may comprise at least one hole 66 extending through its peripheral wall 63 to allow the liquid 52 to flow out of the carrier 60. The hole 66 may be closed by a plug member (not shown).

In another example embodiment of the present invention, the carrier 60 comprises a second recess or portion 68 designed to hold the container 50. The peripheral wall 63 of the carrier 60 near the container 50 may have a cutout 69 to permit easier placement and removal of the container 50. The first recess 62 and the second recess 68 may be separated by a divider or wall 70 extending or formed in the peripheral wall 62 of the carrier 60.

As will be explained below, operation of the system of the present invention can be accomplished by utilizing the power supply or battery of the device used with the rotary cutting tool 30. For example, a handheld drill having a rechargeable battery can be used to operate the system 10 while cleaning the rotary cutting tool or bit 30. By utilizing the power supply of the device that uses the rotary cutting tool 30 a user does not have to worry about charging another battery or power supply. The present invention can also be used with manually operated tools such as manual hand drills and the like. In either case, once a user actuates the battery or power supply of the rotary device it will rotate the system 10. Similarly, once a user manually rotates a hand drill the rotation of the rotary cutting tool 30 will operate the system 10 of the present invention. In another embodiment of the present invention, the system 10 of the present invention can include its own power supply that can be integrated, replaceable, removable, re-usable, and/or rechargeable.

In use, a user may remove the top 16 of the cartridge or housing 14 and insert one or more cleaning members or roller 12 into its interior 24. The user may then replace the top 16, making sure that the cleaning members or roller 12 are positioned in the sockets 26a and 26b so that they may rotate freely about their axis. The user then places the cartridge 14 into the first recess 62 of the carrier, which holds it and prevents it from rotating. Next, the user inserts the rotary cutting tool 30 into the opening 18 of the top 16. The rotary cutting tool 30 is positioned such that its insertion into the cartridge causes it to come into contact with the cleaning members or rollers 12.

A user then connects a drill or other rotation imparting tool to the shank of the rotary cutting tool 30. The user then switches or powers on the drill. As the drill rotates the rotary cutting tool 30 its rotational movement is imparted onto the cleaning members or rollers 12. The cleaning members or rollers 12 will continue to rotate as long as the rotary cutting tool 30 is rotating. As the cleaning members or rollers 12 and the rotary cutting tool 30 rotate they engage each other causing the engagement members or bristles 40 to engage the debris in the flutes of the rotary cutting tool 30. Because the rotation of the rotary cutting tool 30 creates rotation of the cleaning members or rollers 12, the rotary cutting tool 30 cannot cut or degrade the cleaning members or rollers 12, as compared to a rigidly mounted brush design.

As the engagement members or bristles 40 cause the debris and shavings to dislodge from the flutes of the rotary cutting tool 30, they fall to the bottom 20 of the cartridge 14. The bottom 20 can be removed from the cartridge 14 to dispose of the debris and shavings. Alternatively, a user may squeeze the container 50 to force a stream of liquid 52 through the spout 54 and into the opening 56 of the top 16 of the cartridge 14. The liquid 52 then flows down onto the rotary cutting tool 30 and bristles 40 flushing the debris and shavings into the bottom 20 of the cartridge 14.

If a screen 60 is present in the bottom 20 of the cartridge 14, it may trap the debris and shavings while permitting the liquid 52 to flow lower into the bottom 20. In this way, the user is able to pour the liquid 52 out of the hole 66 in the carrier 60 first and then dump the debris and shavings into the trash.

Once the rotary cutting tool 30 is cleaned off, the user may remove the rotary cutting tool 30 from the device 10. A user may also remove and clean the cleaning members or rollers 12 by removing the top 16 and pulling the rollers 12 out of the interior 24 of the cartridge 14. The cleaning members or roller 12 may be washed, or blown clean with pneumatic air and then placed back into the interior 24 of the cartridge 14.

The drill bit cleaning device 10 of the present disclosure may be made of any suitable materials and may have dimension suitable for cleaning any desired rotary cutting tool or other rotating tool, such as a reamer.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claim.

What is claimed is:

1. A rotary cutting tool cleaning system, for cleaning debris and shavings from a rotary cutting tool, the rotary cutting tool cleaning system comprising:
   a cylindrical rotary cutting tool having one or more cutting edges;
   a cartridge having an interior, the cartridge having at least one access opening configured to provide access to the interior;
   at least two upright cleaning members rotatably mounted adjacent to each other in the interior of the cartridge, each of the two upright cleaning members have a plurality of outwardly extending engagement members overlapping each other and filling a space between the two upright cleaning members; and
   wherein the cylindrical rotary cutting tool insertable in the at least one access opening abuts the plurality of outwardly extending engagement members of the at least two upright cleaning members, whereby rotational movement of the cylindrical rotary cutting tool imparts movement of the plurality of outwardly extending engagement members of the two upright cleaning members such that plurality of outwardly extending engagement members imparts rotational movement on each other cleaning the cylindrical rotary cutting tool.

2. The rotary cutting tool system of claim 1, wherein the cartridge comprises a top and the at least one access opening extends through a portion of the top.

3. The rotary cutting tool system of claim 1, further comprising a pair of axially aligned posts extending from a portion of each of the at least two upright cleaning members and a pair of axially aligned sockets formed in the interior of the cartridge, wherein the pair of axially aligned posts are configured to mate with the pair of axially aligned sockets.

4. The rotary cutting tool system of claim 1, wherein the plurality of outwardly extending engagement members of each of the at least two upright cleaning members comprises a plurality of outwardly extending bristles.

5. The rotary cutting tool system of claim 1 further comprising a bottle configured to contain a cleaning fluid and spout, wherein the spout is positionable to direct a flow of the fluid into the interior of the cartridge.

6. The rotary cutting tool system of claim 5 further comprising a second access opening configured to receive a portion of the spout, wherein the second access opening is proximate to the at least one access opening.

7. The rotary cutting tool system of claim 5, wherein the cartridge further comprises a bottom having an inner space and a screen positioned in the inner space, wherein the screen collects the debris and shavings while permitting passage of the liquid.

8. The rotary cutting tool system of claim 1, wherein the cartridge further comprises a bottom having a space configured to collect the debris and shavings.

9. The rotary cutting tool system of claim 8, wherein the bottom includes a peripheral wall mateable with a portion of the cartridge, wherein the bottom can be removed for disposing of the debris and shavings.

10. The rotary cutting tool system of claim 8, further comprising a screen disposed in the space of the bottom to collect the debris and shavings.

11. The rotary cutting tool system of claim 1, wherein each of the at least two upright cleaning members comprises at least one roller having a plurality of outwardly extending bristles configured to clean the rotary cutting tool, and further comprising a power supply in operative communication with the at least one roller.

12. A non-electric rotary cutting tool cleaning kit, for cleaning debris and shavings from a rotary cutting tool, the rotary cutting tool cleaning system comprising:
   a cylindrical rotary cutting tool having one or more cutting edges;
   a cartridge having an interior, the cartridge having at least one access opening configured to provide access to the interior and a bottom having an inner space configured to collect the debris and shavings during the cleaning;
   a first upright cleaning member rotatably mounted in the interior of the cartridge, the first upright cleaning member having outwardly extending bristles;
   a second upright cleaning member rotatably mounted in the interior of the cartridge, the second upright cleaning member having outwardly extending bristles;
   wherein the outwardly extending bristles of the first upright cleaning member and the outwardly extending bristles of the second upright cleaning member overlap and engage each other; and
   wherein the cylindrical rotary cutting tool insertable in the at least one access opening abuts the outwardly extending bristles of the first upright cleaning member and the second upright cleaning member, whereby rotational movement of the cylindrical rotary cutting tool causes the outwardly extending bristles to clean the cylindrical rotary cutting tool of the debris and shavings that fall into the inner space of the bottom of the cartridge.

13. The non-electric rotary cutting tool cleaning kit of claim 12, further comprising an axially aligned post extending from a portion of the first upright cleaning member and the second upright cleaning member and a pair of axially aligned sockets formed in the interior of the cartridge, wherein the pair of axially aligned posts are configured to mate with the axially aligned sockets of the first upright and second upright cleaning members to allow rotational movement of the first upright and second upright cleaning members.

14. The non-electric rotary cutting tool cleaning kit of claim 13, wherein rotational movement of the cylindrical rotary cutting tool imparts rotational movement of at least one of the first upright cleaning member or the second upright cleaning member.

15. The non-electric rotary cutting tool cleaning kit of claim 14, wherein the first upright cleaning member and the second upright cleaning member comprise a roller.

16. The non-electric rotary cutting tool cleaning kit of claim 12, wherein outwardly extending bristles of the first upright cleaning member and second upright cleaning member occupy a space between the first upright cleaning member and the second upright cleaning member.

17. The non-electric rotary cutting tool cleaning kit of claim 12, further comprising a bottle configured to contain a cleaning fluid and spout, wherein the spout is positionable to direct a flow of the fluid into the interior of the cartridge and onto the rotary cleaning tool to aid in its cleaning.

18. The non-electric rotary cutting tool cleaning kit of claim 17, further comprising a screen positioned in the inner space of the bottom configured to collect the debris and shaving while permitting passage of the liquid allowing separate disposal of the debris and shavings, and the liquid.

19. The non-electric rotary cutting tool cleaning kit of claim 12, further comprising a carrier having a recess configured to receive the cartridge and to inhibit its rotational movement while the cylindrical rotary cutting tool is being cleaned.

* * * * *